Oct. 9, 1956 A. G. KLING ET AL 2,766,411

SELF-CONTAINED TRIMMER CAPACITOR

Filed Oct. 16, 1953

*INVENTOR.*
ARNOLD G. KLING
CHARLES E. NYGREN
BY John W. Michael
ATTORNEY

United States Patent Office 2,766,411
Patented Oct. 9, 1956

2,766,411

SELF-CONTAINED TRIMMER CAPACITOR

Arnold G. Kling and Charles E. Nygren, Milwaukee, Wis., assignors to Globe-Union Inc., Milwaukee, Wis., a corporation of Delaware Application October 16, 1953, Serial No. 386,528

5 Claims. (Cl. 317—249)

This invention relates to improvements in trimmer capacitors and particularly to self-contained trimmer capacitors used on television tuners, selector switches and other mechanisms operated by rotary hollow shafts.

As is shown in U. S. Patent No. 2,584,176, issued to R. R. Wingert on February 5, 1952, it is common practice in the fine tuning of a chosen channel to mount a trimmer capacitor of the end of a circuit selector mechanism having a hollow operating shaft. The stationary plate of the capacitor is usually supported on the last switch wafer and the rotariable capacitor plate is rigidly mounted on a vernier shaft mounted in the main shaft. One of the difficulties with this construction is that the rotary plate must be pinned or otherwise secured to the vernier shaft in the completely assembled state of the unit to allow for tolerance accumulations which occur in the spacers, plates, and other parts of such selector mechanism. Another disadvantage is that any longitudinal displacement of the vernier shaft will change the spacing between the capacitor plates of the trimmer and may permanently damage the adjustment necessary for fine tuning.

It is an object of this invention therefore to provide a trimmer capacitor which is selfcontained and when mounted on the end of a circuit selector mechanism will maintain proper spacing between the capacitor plates even though there be some longitudinal movement of the vernier shaft.

Another object of this invention is to provide a trimmer capacitor of this type which is a selfcontained and pre-assembled unit and can be readily mounted completely assembled to the end of a selector switch without making a rigid connection between the capacitor shaft and the rotary plate in the completely assembled state of the mechanism.

These objects are obtained by using an insulating mounting plate to which is rigidly fixed one of the capacitor plates and to which the other plate is rotatively mounted. Such insulating plate provides the support for both plates and thus assures accurate spacing therebetween without regard to tolerances of the selector mechanism. The rotative plate and the capacitor shaft are interconnected by any means which will transmit rotation while permitting axial movement therebetween. A bushing or other form of bearing may provide the rotative connection between the insulating plate and rotor plate. A spring secured to the mounting plate and having portions resiliently engaging such bushing provides both a brake and a ground. Any longitudinal movement of the capacitor shaft relative to the capacitor will not have any effect in changing the proper spacing between the stator and rotor plates.

For a more detailed description of this invention reference should be made to the following description of a specific embodiment read in connection with the accompanying drawings, in which.

Figure 1:
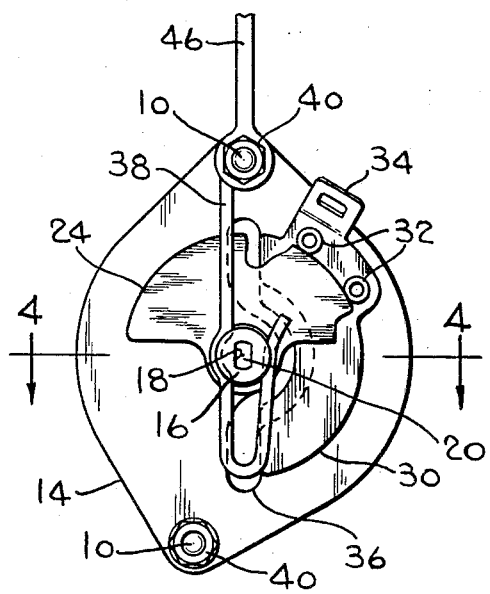
Fig. 1 is a plan view of the rear side of a selfcontained trimmer capacitor embodying the present invention.
Figure 2:
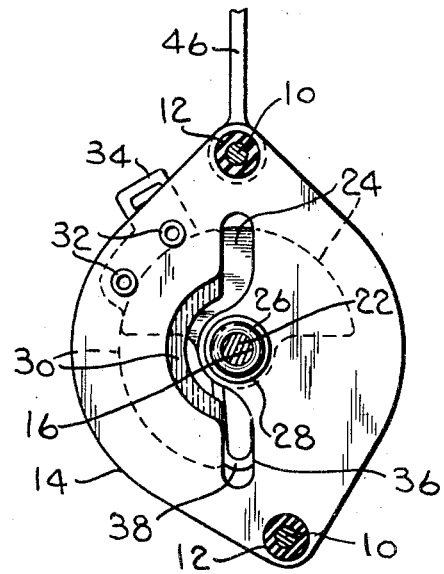
Fig. 2 is a plan view of the front side of the trimmer capacitor of Fig. 1.
Figure 3:
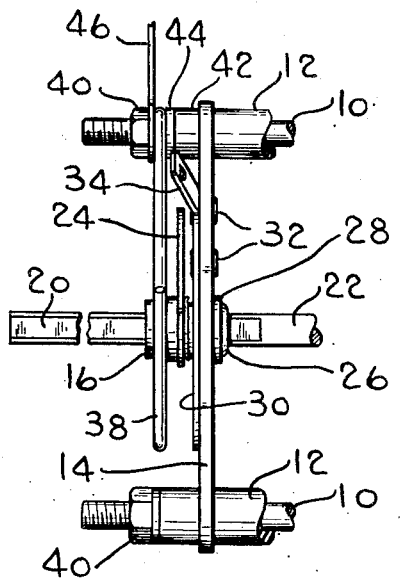
Fig. 3 is a view in side elevation of the trimmer capacitor of Fig. 1.
Figure 4:
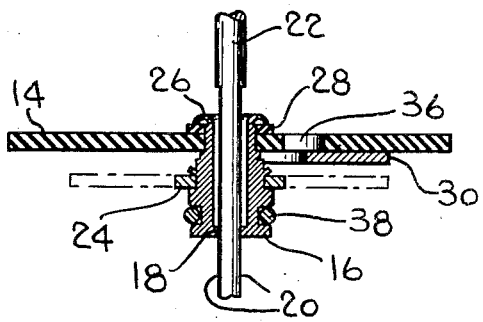
Fig. 4 is a sectional view taken on the line 4—4 of Fig. 1.

The selfcontained trimmer capacitor illustrated in the drawing is particularly adapted to be mounted on the rear end of a circuit selector mechanism having a hollow operating shaft. The multiple sections of such mechanism are secured to each other to form a unit by longitudinal studs 10 and insulating spacers 12. A bakelite mounting plate 14 forms the support for the trimmer capacitor. Such plate is pierced to receive the studs 10. In this embodiment the studs are not diametrically opposite each other. However, in many such mechanisms the studs will be diametrically positioned and in such case the mounting plate 14 will have its stud receiving apertures arranged accordingly. The plate 14 has a central opening in which is rotatably fitted a bushing 16. At its rear end (left as viewed in Fig. 3), the bushing 16 has a flattened opening 18 which will slidably receive the flattened end 20 of a vernier or capacitor shaft 22. The flats on the shaft engage the flats in the opening 18 to transfer angular motion while permitting axial movement of the shaft relative to the bushing. A semi-circular rotor plate 24 is rigidly fixed to the central part of the bushing 16. The front end of the bushing 16 is reduced in diameter to form a shoulder which bears against the rear face of the mounting plate 14. This end protrudes through the central opening in such plate and is flanged over at 26 to bear against an insulating washer 28 and hold the bushing 16 against axial displacement while permitting rotational movement relative to the plate 14.

A semi-circular stator plate 30 is rigidly secured to the rear face of the mounting plate 14 by a pair of eyelets 32. This plate has an extending leg 34 providing a terminal. The rotor plate 24 moves in a plane accurately spaced from the stator plate 30 by the bushing 16 and hence any tolerance pile-ups in the circuit selector mechanism will not affect the capacitance coupling. In some instances it may be necessary to decrease the minimum capacitance. This may be done by cutting away part of the insulating material in the plate 14 along the diametrical edge of the stator plate 30 to form an air gap as indicated at 36.

The rotor plate 24 is grounded by a hook shaped spring 38 which engages the walls of a groove in the bushing 16 from opposite sides and is secured to one of the studs 10 by the same nut 40 which locks the trimmer capacitor to the circuit selector mechanism. An insulating spacer 42 and metal washer 44 may be placed on the stud 10 between the wire 38 and the plate 14 to locate such wire in proper position. In some instances it may be desirable to add a terminal 46 for grounding the rotor plate separately from the stud 10.

It is easy to add the selfcontained trimmer capacitor to the rear of the circuit selector mechanism. The plate 14 is slid over the ends of the studs and seated against the spacers 12 extending the desired distance from the last switch section. The spacer 42, washer 44 and spring 38 are likewise slid over one of the studs 10 at the time. With the unit in such position the customary nuts 40 are threaded on the studs 10 to complete the assembly. The capacitor shaft 22 is passed through the hollow operating shaft of the selector mechanism and its flattened end 20 is inserted in the flattened opening 18. Upon rotation of the shaft 22 the rotor plate 24 may be swung from the minimum capacity position diametrically opposite the stator plate 30 to its maximum capacity position superimposed over the stator 30. There is sufficient friction between the spring 38 and the bushing 16 to hold the rotor plate in any selected position. However, if any axial movement is imparted to the shaft 22 either during its operation or during the operation of the main hollow shaft, such axial movement will not be imparted to the rotor 24 and the capacitor spacing will remain fixed. In the assembly of the selfcontained trimmer any inaccuracies in the spacing of the various sections of the selector mechanism will not be imparted in accumulated fashion to change the spacing between the fixed stator 30 and the rotor plate 24.

While there is shown a particular embodiment of this invention, many modifications may be made and it is contemplated that the following claims cover any such modifications as come within the spirit and scope of this invention.

We claim:

1. A selfcontained trimmer capacitor for a circuit selector mechanism with studs, having only one insulating mounting plate adapted to be secured to said studs, a stator plate rigidly secured to said mounting plate, a bushing rotatably mounted in said mounting plate, said bushing having a shoulder bearing against one face of said mounting plate and an end protruding through said mounting plate and flanged over the other side of said mounting plate to support said bushing and prevent axial movement thereof relative to said mounting plate, a rotor plate rigidly fixed on said bushing and rotatable therewith in spaced relation to said stator plate, a non-circular opening in said bushing, and a shaft for said capacitor having a non circular portion seated in said non circular opening to provide angular drive from said shaft to said bushing while permitting relative axial movement therebetween.

2. For use with a rotary circuit changing mechanism having mounting studs and a hollow main operating shaft, a selfcontained trimmer capacitor having only one insulating mounting plate forming the support for said capacitor, said mounting plate having portions adapted to be secured to said studs, a stator plate fixed to said mounting plate and forming one electrode of said capacitor, a metal bushing rotatably secured to said mounting plate and spaced from said stator plate, said bushing having an opening therethrough with a non circular portion, a rotor plate carried by said bushing and movable in a plane spaced from said stator plate to form the other electrode of said capacitor, a vernier shaft adapted to be carried by said main shaft and having a non circular portion engaging the non circular portion of said bushing to impart rotary motion thereto while having axial motion relative thereto, and means frictionally engaging said bushing and adapted to be secured to one of said studs.

3. A selfcontained trimmer capacitor as claimed in claim 2 in which said stator plate has an integral extending leg providing a terminal for said one electrode.

4. A selfcontained trimmer capacitor as claimed in claim 2 in which said bushing has an annular groove, and said means is a spring wire having opposed portions seated in said groove to hold said spring assembled to said bushing and provide rotative sliding engagement establishing electrical contact therebetween.

5. A selfcontained trimmer capacitor as claimed in claim 4 in which said bushing also has a reduced portion fitting snugly in an opening in said mounting plate, a shoulder seating aaginst the face of said mounting plate and a flanged portion effecting pressure against the opposite face of said mounting plate to hold said bushing against axial displacement relative to said plate.

References Cited in the file of this patent

UNITED STATES PATENTS

| | | |
|---|---|---|
| 2,104,569 | Muth | Jan. 4, 1938 |
| 2,214,659 | Dardess | Sept. 10, 1940 |
| 2,584,120 | Fyler | Feb. 5, 1952 |
| 2,620,378 | Thias | Dec. 2, 1952 |